United States Patent
Burke

(10) Patent No.: US 6,819,340 B2
(45) Date of Patent: Nov. 16, 2004

(54) ADDING A SHORTCUT TO A WEB SITE

(76) Inventor: Paul E. Burke, 3755 Henry Hudson Pkwy., Apt. 8H, Riverdale, NY (US) 10463

( * ) Notice: Subject to any disclaimer, the term of this patent is extended or adjusted under 35 U.S.C. 154(b) by 518 days.

(21) Appl. No.: 09/910,724

(22) Filed: Jul. 23, 2001

(65) Prior Publication Data

US 2003/0016241 A1 Jan. 23, 2003

(51) Int. Cl.[7] .............................. G06F 3/14; G06F 15/16
(52) U.S. Cl. ........................ 345/738; 345/733; 345/749; 345/778; 345/847; 709/203; 709/219; 715/501.1
(58) Field of Search ................................ 345/854, 835, 345/733, 738, 749, 760, 808, 840, 778, 779, 741, 744, 746, 747, 704; 715/501.1, 513; 709/219, 203, 202, 201, 217, 227, 229; 705/14, 26

(56) References Cited

U.S. PATENT DOCUMENTS

| | | | | |
|---|---|---|---|---|
| 5,724,595 A | * | 3/1998 | Gentner ................... 715/501.1 |
| 5,877,765 A | * | 3/1999 | Dickman et al. ........... 345/738 |
| 5,914,714 A | * | 6/1999 | Brown .................... 345/840 X |
| 6,544,295 B1 | * | 4/2003 | Bodnar ....................... 709/219 |
| 2001/0034646 A1 | * | 10/2001 | Hoyt et al. ................... 705/14 |
| 2002/0089535 A1 | * | 7/2002 | Morrell ...................... 345/738 |
| 2003/0158790 A1 | * | 8/2003 | Kargman ..................... 705/26 |

* cited by examiner

Primary Examiner—Raymond J. Bayerl
(74) Attorney, Agent, or Firm—Walter J. Tencza, Jr.

(57) ABSTRACT

A method and an apparatus for accessing a web site quickly is provided. Part of the computer software for implementing the present invention will be called "See You Again Shortcut™" software in this application. The "See You Again Shortcut™" software gives visitors to the vendor's web site, the ability to create a shortcut link to access the vendor's web site. The shortcut link may appear on the visitor's display. The shortcut link may be a logo or trademark of the vendor. The shortcut link may appear on the desktop display, start menu display, favorites menu display, Windows (TRADEMARKED) QuickLaunch Bar display, or in any other manner on the visitor's display. Selecting the shortcut link on the visitor display will cause a web page of the vendor's web site to appear on the visitor's display.

22 Claims, 12 Drawing Sheets

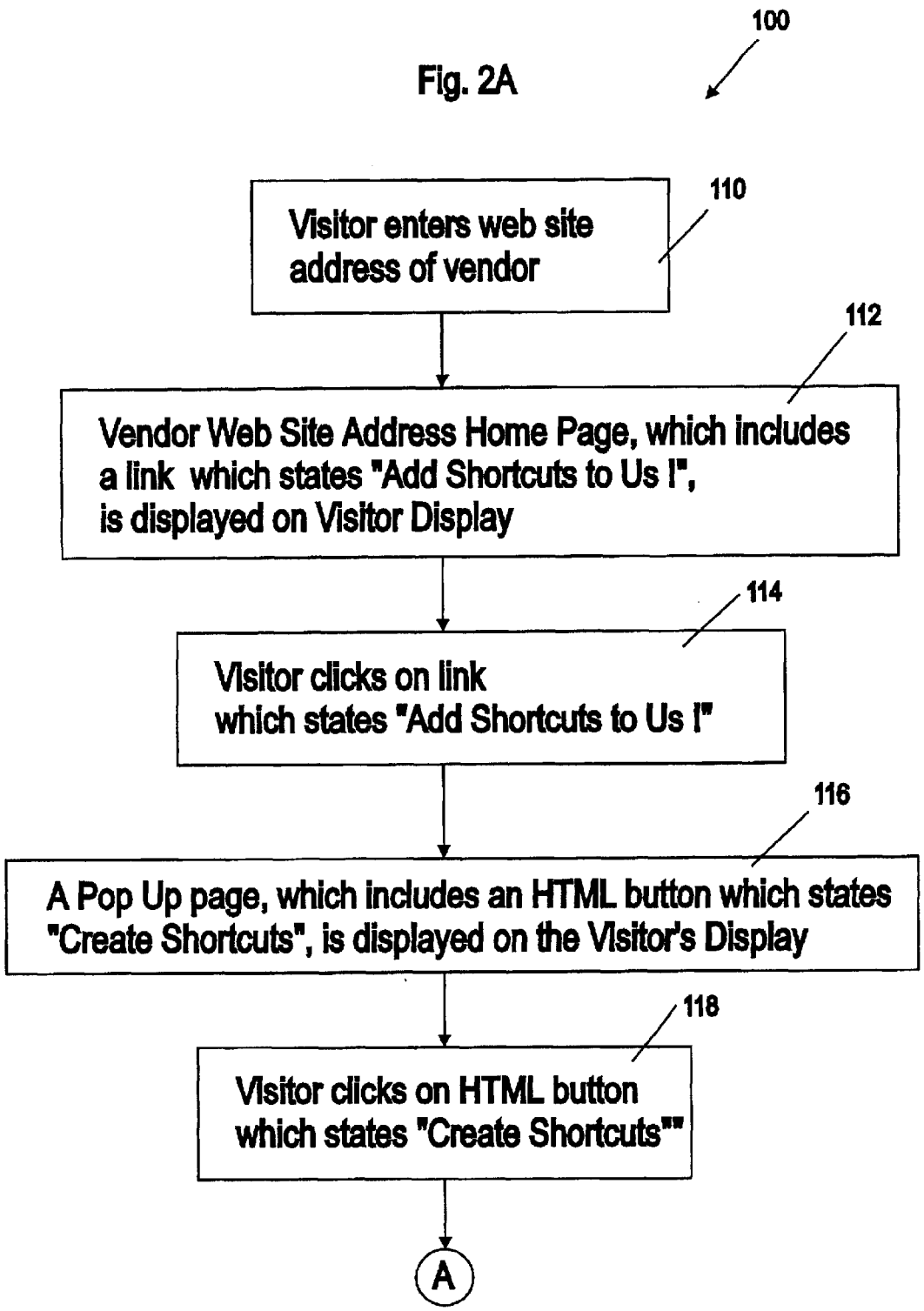

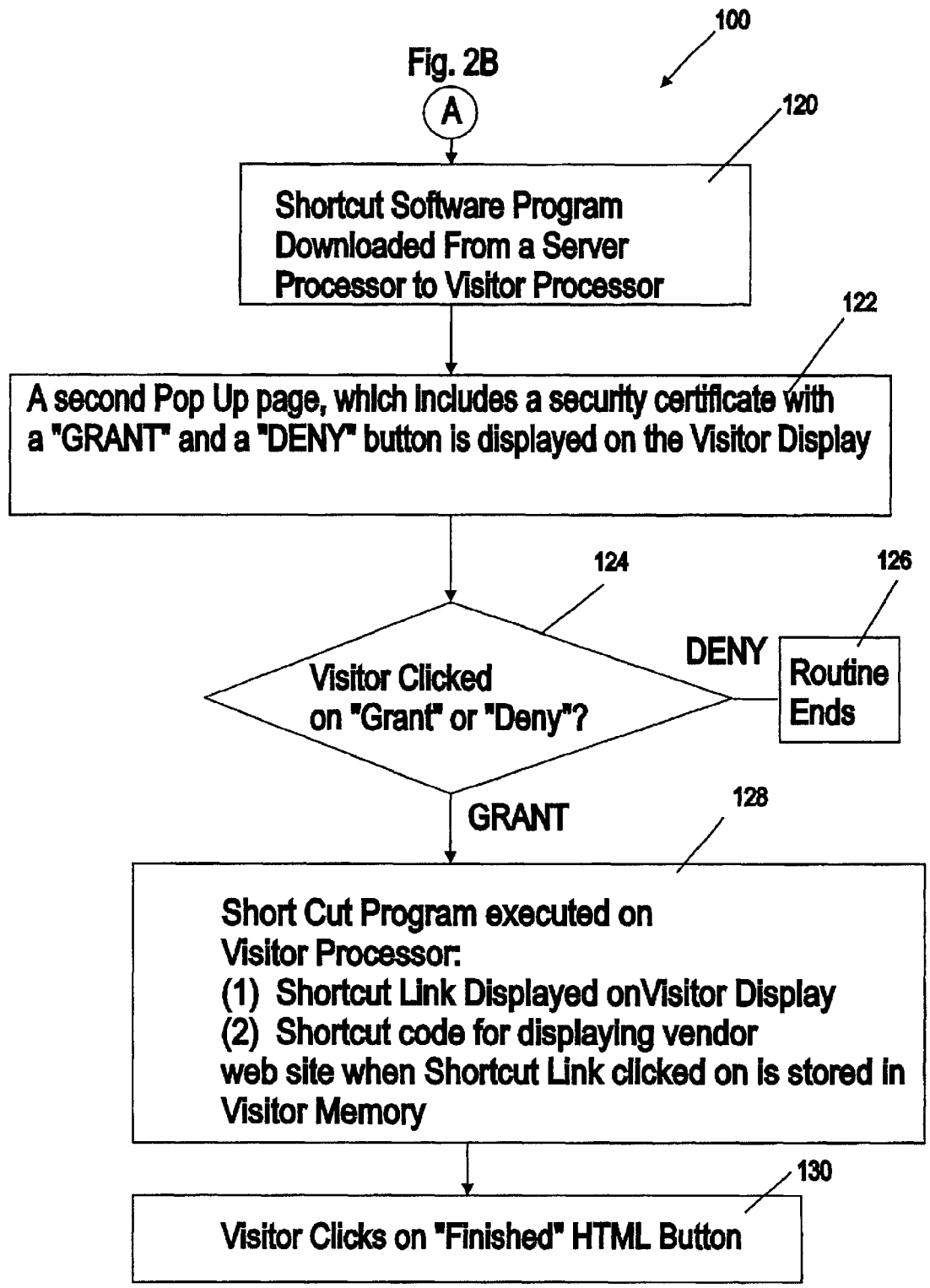

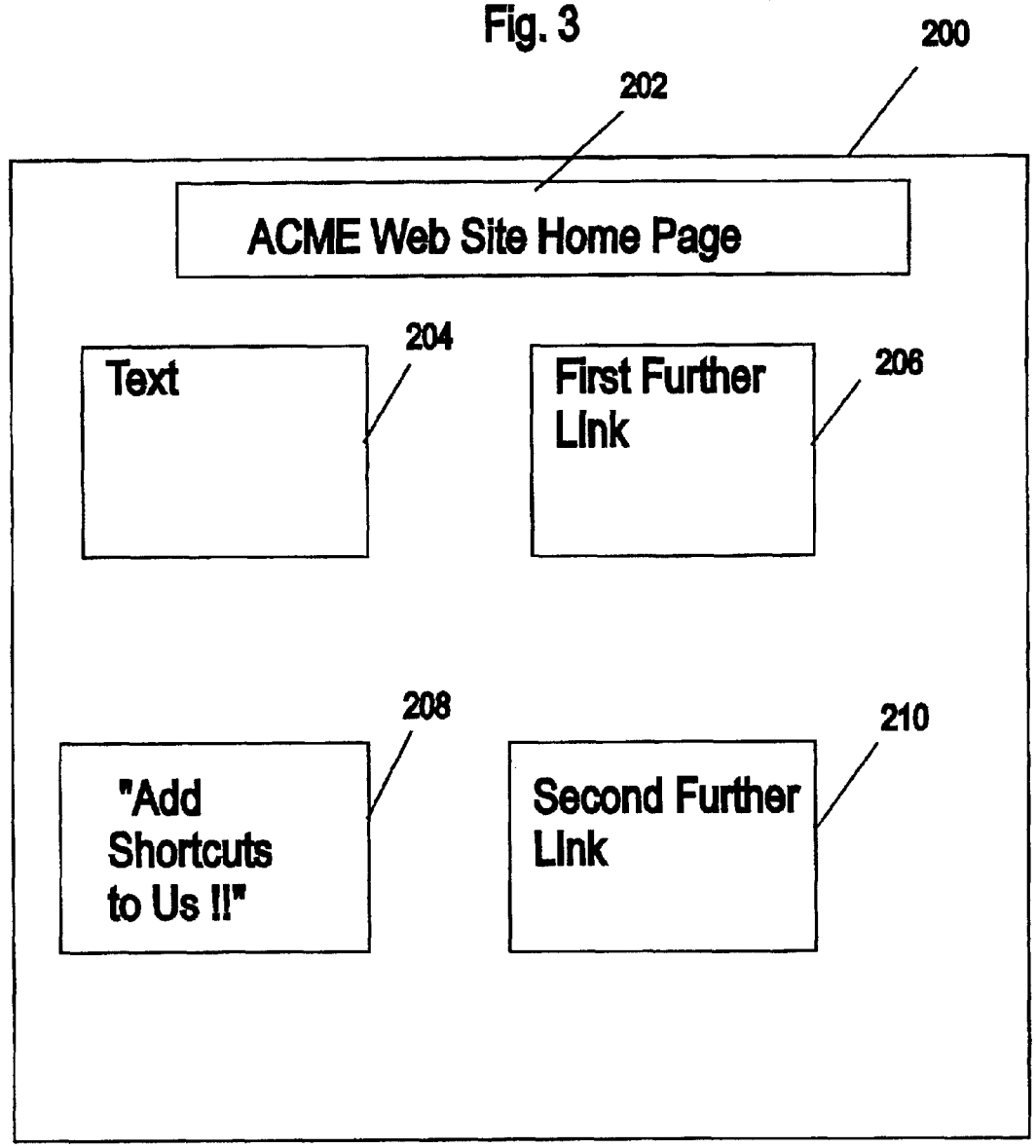

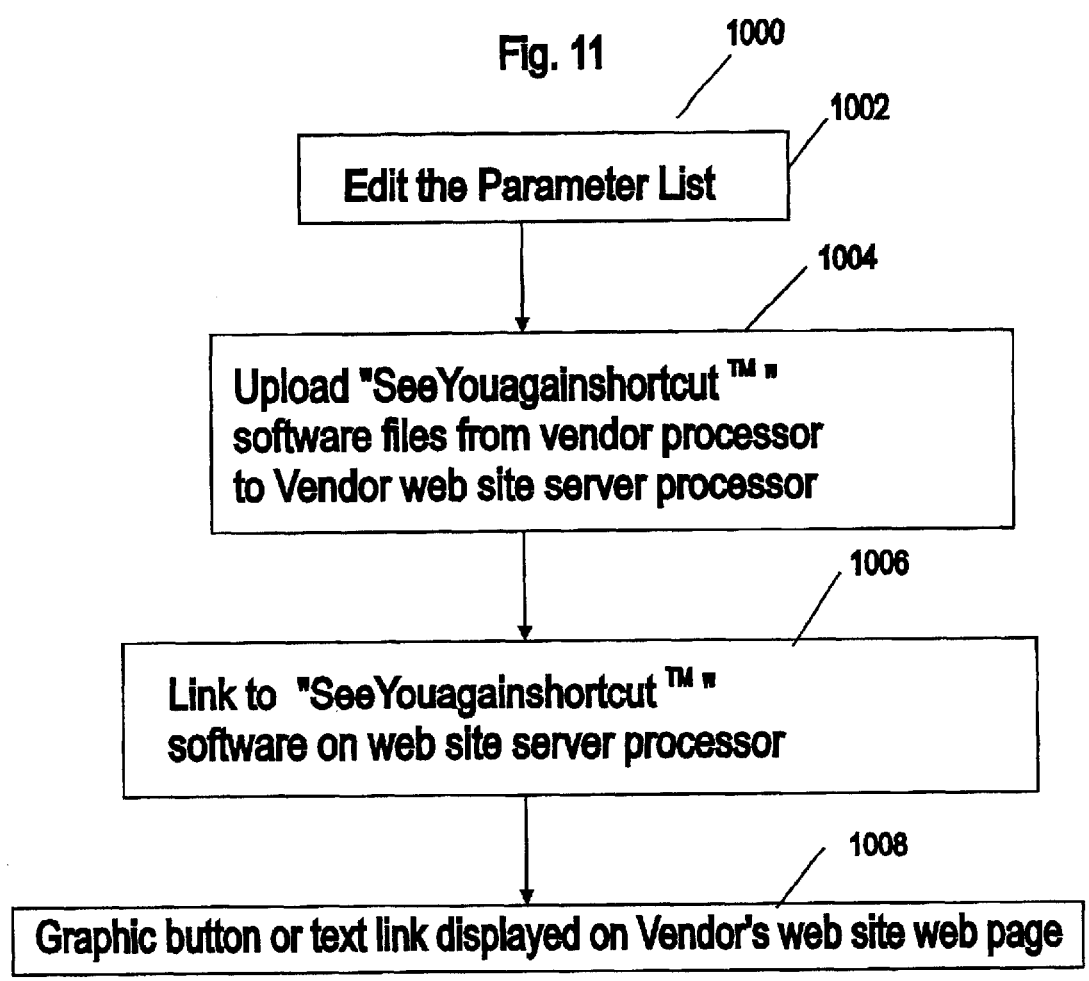

ADDING A SHORTCUT TO A WEB SITE

FIELD OF THE INVENTION

This invention relates to improved methods and apparatus for accessing and driving traffic to web sites.

BACKGROUND OF THE INVENTION

Typically in the prior art a user or visitor accesses a web site address by activating a web site browser such as "Internet Explorer" (TRADEMARKED) or "Netscape" (TRADEMARKED) and then entering a web site address on an address line. This is inconvenient in that it requires several steps and requires the user to remember what often may be a difficult to remember, or difficult to spell, web site address.

It is known to place an icon onto a desktop or Start Menu for the purpose of accessing desktop applications such as Microsoft Word (TRADEMARKED) and Quicken (TRADEMARKED). These icons link to executable programs for the desktop applications.

SUMMARY OF THE INVENTION

The present invention in one or more embodiments provides a method and apparatus for accessing a web site quickly. Part of the computer software for implementing the present invention will be called "See You Again Shortcut™" software in this application. This software can be purchased by a vendor having a vendor web site. The vendor can run the "See You Again Shortcut™" software on a vendor processor, edit parameters, upload the "See You Again Shortcut™" software to a vendor web site server processor, and activate the "See You Again Shortcut™" software on the vendor web site server processor.

The "See You Again Shortcut™" software gives visitors to the vendor's web site, the ability to create a shortcut link on the visitor's desktop menu or start menu or some other menu on the visitor's display to access the vendor's web site. The shortcut link may have an icon associated with it and may appear on the visitor's display.

The shortcut link that appears on the visitor's Desktop display may be placed on the visitor's display as a .ICO file which is the file format for a "Windows" (TRADEMARKED) icon. The "Windows" (TRADEMARKED) operating system running on the visitor processor will automatically display the .ICO file on the desktop.

A graphic button (e.g. "Add Shortcuts to Us") or any kind of link is typically included on a vendor's web page at which point the visitor could click on it to initiate the shortcut creation process.

The shortcut link may be a logo or trademark of the vendor. The shortcut link may appear on the desktop display, start menu display, favorites menu display, or in any other manner on the visitor's display. Selecting the shortcut link on the visitor display will cause a web page of the vendor's web site to appear on the visitor's display. The shortcut link may appear in the Windows QuickLaunch (TRADEMARKED) display of the visitor's display as well.

The present invention in one embodiment includes a method comprising the step of placing a first link on a vendor's web site page of a vendor's web site. The first link can be a graphic button. The method may also include causing a second link which can also be called the shortcut link to be placed on a visitor display in response to an add shortcut process started by the selection of the first link on the vendor's web site page by a visitor to the vendor's web site page. The selection of the second link or shortcut link on the visitor display, such as with a computer mouse, may cause a vendor's web site page of the vendor's web site to be displayed on the visitor display.

The selection of the shortcut link on the visitor display may cause a coupon code, a username and a password, or affiliate identification data to be transferred to a vendor web site server processor. The add shortcut process may include granting privileges to allow the "See You Again Shortcut™" software program to make changes to computer software running on the visitor's processor. The add shortcut process may include displaying a first pop up screen on the visitor display in response to selection of the first link on the vendor web site web page.

See You Again Shortcut™ computer software provides the facility to create a single shortcut link or multiple shortcut links (theoretically to infinity) onto a visitor's computer processor in a single initialization of the software on both the vendor's processor and the visitor's processor. See You Again Shortcut™ software is a shortcut software program which creates a shortcut file on a visitor's processor. This shortcut file is comprised of software code to load the specified web site as well as an icon in the .ico file format.

The following is a high level overview of various aspects of the present invention in one or more embodiments:

1. See You Again Shortcut™ software is software which is downloaded onto a visitor's processor.
2. See You Again Shortcut™ software typically automatically runs.
3. The "Shortcut icon" is downloaded and typically stored on a visitor's hard drive (where hard drive is part of memory of the visitor processor)
4. The "Shortcut file" is written to visitor's hard drive.
5. The "Shortcut" appears, typically, on the Windows Desktop display on the visitor display which causes an icon to be stored in RAM (part of visitor memory) (as this is necessary to consistently display the icon) on the Windows Desktop.

BRIEF DESCRIPTION OF THE DRAWINGS

FIGS. 2A–2B shows a flow chart of a method for allowing a visitor to a web site to add a shortcut link for accessing the web site to the visitor's display;

FIG. 3 shows an example of a web site home page in accordance with a first embodiment of the present invention;

FIG. 11 shows a flow chart of a method for adding a graphic button to a vendor's web site, which allows a visitor to the web site to add a shortcut to the vendor's web site.

DETAILED DESCRIPTION OF THE DRAWINGS

Figure 1:
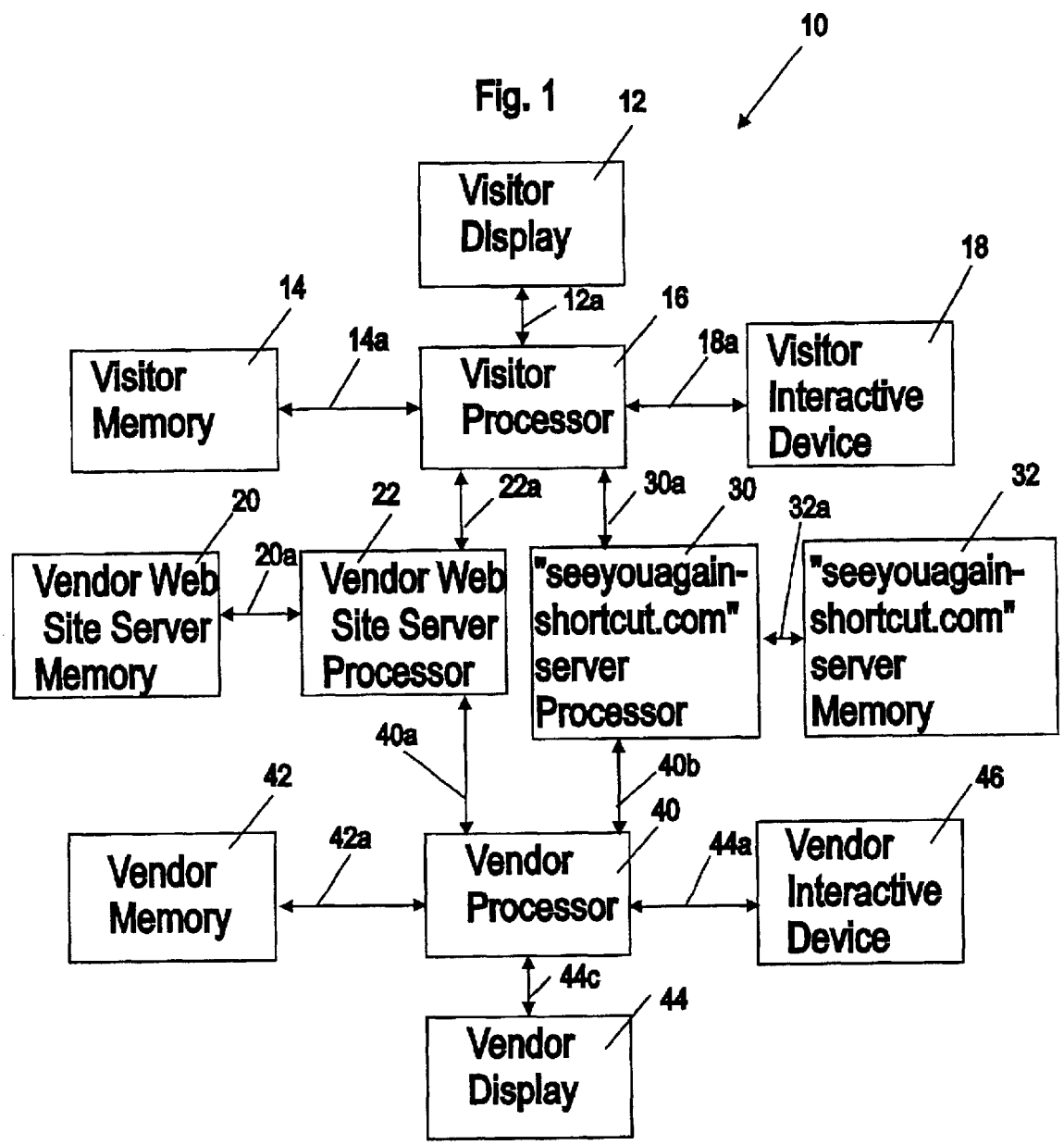
FIG. 1 shows an apparatus for implementing various embodiments of the present invention.

FIG. 1 shows an apparatus 10 comprising a visitor display 12, a visitor memory 14, a visitor processor 16, a visitor interactive device 18, a vendor web site server memory 20, a vendor web site server processor 22, a "SeeYouAgain-Shortcut.com"™ server processor 30, a "SeeYouAgain-Shortcut.com"™ server memory 32, a vendor display 44, a vendor memory 42, a vendor processor 40 and a vendor interactive device 46.

Visitor display 12 is electrically connected to visitor processor 16 by bus 12a. Bus 12a and other busses of apparatus 10 may be wireless connections, software connections, hardwire connections, optical connections, or any other method or apparatus known for connecting the various modules. Visitor processor 16 is electrically connected to visitor memory 14 by bus 14a, to visitor interactive device 18 by bus 18a, to vendor web site server processor 22 by bus 22a, and to "SeeYouAgainShortcut.com" ™ server processor 30 by bus 30a.

Vendor web site server processor 22 is electrically connected by bus 20a to vendor web site server memory 20 and to vendor processor 40 by bus 40a. "SeeYouAgainShortcut.com" ™ server processor 30 is electrically connected to vendor processor 40 by bus 40b. Vendor processor 40 is electrically connected to vendor memory 42 by bus 42a, to vendor display 44 by bus 40a, and to vendor interactive device 46 by bus 44a.

FIGS. 2A–2B shows a flow chart 100 of a method for allowing a visitor to a web site to add a shortcut link to the visitor's display for accessing the web site. At step 110 the visitor enters a web site address of a vendor onto the address line of a web site browser. The visitor may enter the web site address into the visitor interactive device 18, which may be a keyboard or a computer mouse, or any other known interactive device or combination of interactive devices. This assumes that the particular web site browser has already been activated. At step 112 the vendor's web site home page is displayed on the visitor display 12 of FIG. 1. FIG. 3 is a simplified example of a vendors web site home page 200. The vendor's web site home page 200 may be downloaded from the vendor web site memory 20 to the server processor 22 via bus 20a, then to the visitor processor 16 via the bus 22a, and then displayed on the visitor display 12 via bus 12a. The vendor's web site home page 200 may be temporarily stored in the visitor memory 14.

At step 114, the visitor clicks on graphic button 208, which states "Add Shortcuts to Us!".

In response to the visitor clicking on graphic button 208, at step 116, a pop up page appears. If the visitor is currently employing a "Netscape" (TRADEMARKED) web browser, on their visitor processor 16, the pop up page 300 shown in FIG. 4 appears. The pop up page 300 includes a "minimize" button 302, a restore button 304, and a close button 306 as known in the art for the "Windows" (TRADEMARKED) operating system. The pop up page 300 also includes a "Netscape" symbol 308a (TRADEMARKED), and text 308. The pop up page 300 further includes a button 310 on which is shown the phrase "see you again shortcut.com". The pop up page 300 also includes up and down arrow field 312, text 314, and a graphic button 316, which may be an HTML (Hypertext Markup Language) button, which may state "Create Shortcuts" or "Add Us To Your Desktop!".

Figure 4:
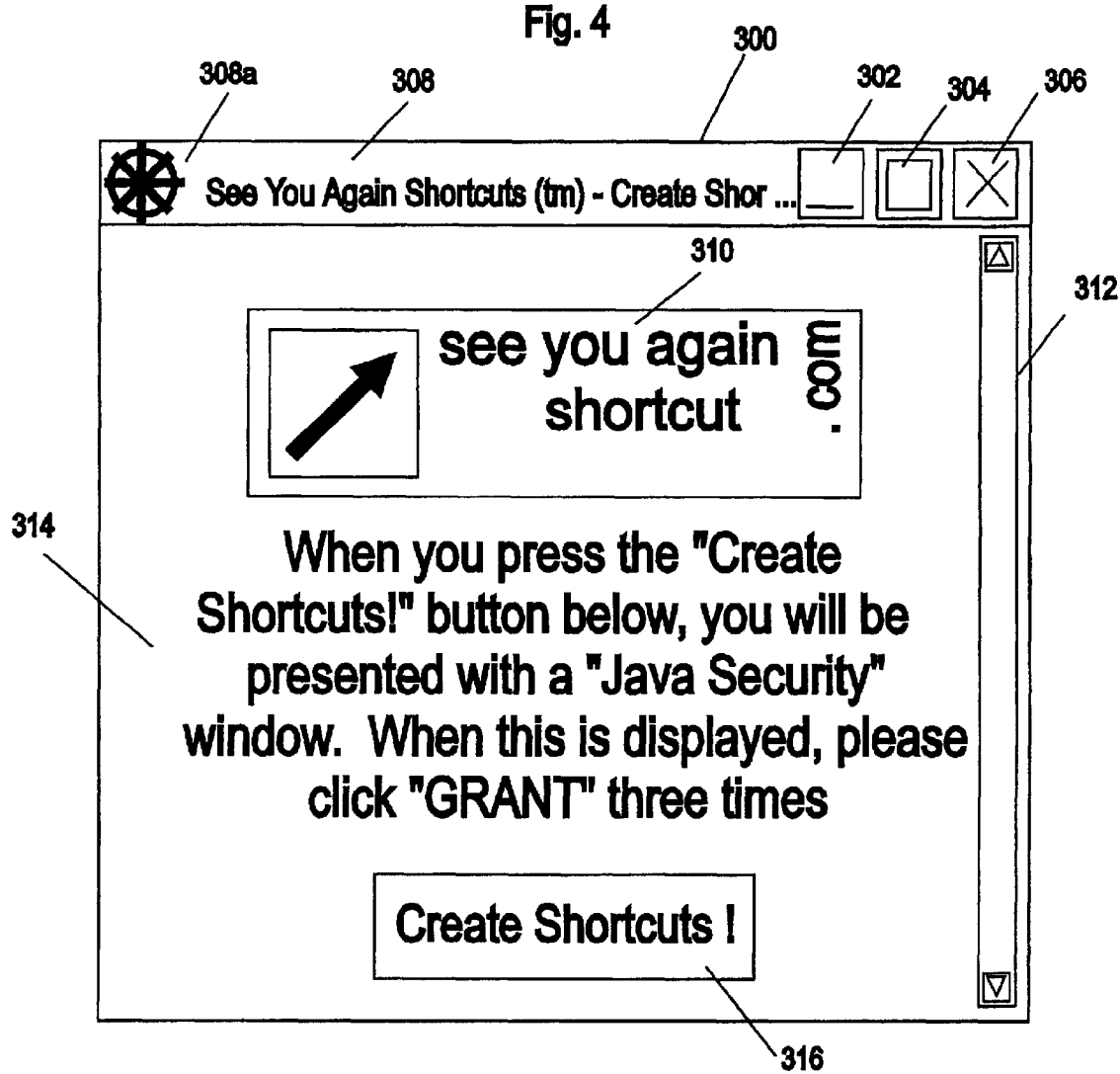
FIG. 4 shows a first pop up screen in accordance with a first embodiment of the present invention.
Figure 5:
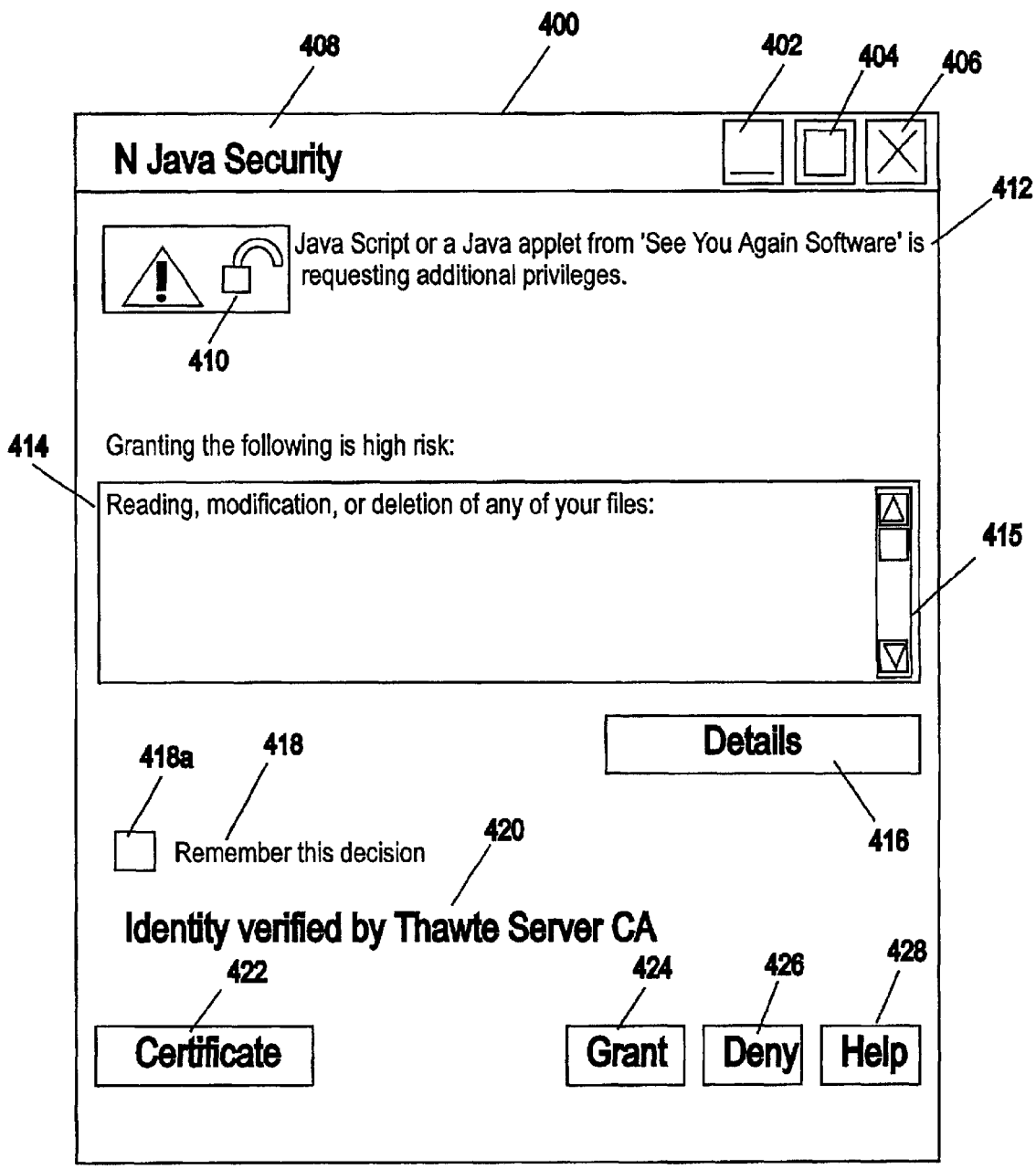
FIG. 5 shows a second pop up screen in accordance with a first embodiment of the present invention.

In response to the visitor clicking on the graphic button 208, at step 116, in one embodiment a pop up page 400 in FIG. 5 may appear directly without the need for the pop up page 300 in FIG. 4. I.e. the popup page 300 may be eliminated or incorporated with the popup page 400 of FIG. 5.

At step 118, visitor clicks on the graphic button 316 by using, for example the visitor interactive device 18 of FIG. 1. At step 120, as shown in FIG. 2B, a shortcut software program is downloaded from either the vendor web site server processor 22 or the "SeeYouAgainShortcut.com" ™ server processor 30 to the visitor processor 16 via bus 22a or bus 30a, respectively. A portion of the "SeeYouAgainShortcut.com"™ software program may be stored in the visitor memory 14. In the case of Internet Explorer (trademarked) the c:\\windows\temp\jum90b1.tmp file mentioned in the security certificate may be stored. A high level overview is that temporary Java files are stored on the visitor's hard drive (in visitor memory 14 or on visitor processor 16) that are then "run" on the visitor processor 16. So, the setup program is not stored in the visitor memory. However, the ultimate outcome—the code for displaying the shortcut—might be stored in the visitor memory 14 or on the visitor processor 16 as it will in all likelihood be technically a part of the "Windows" (TRADEMARKED) Desktop which is an actively running program on the visitor processor 16. The hard drive may be part of memory which may be part of the visitor processor 16 or the visitor memory 14.

At step 122 a further pop up page may be displayed on the visitor display 12. In the case where a "Netscape" (TRADEMARKED) web browser is being employed a pop up page 400 shown in FIG. 5 may appear on the visitor display 12.

The pop up page 400 includes minimize graphic button 402, restore graphic button 404, and close graphic button 406 as known in the Windows (TRADEMARKED) operating system art. The pop up page 400 also includes text 408, warning symbol 410, text 412, text 414, up and down graphic buttons 415, graphic button 416, graphic button 418a, text 418, text 420, and graphic buttons 422, 424, 426, and 428. The visitor may click on either the "Grant" graphic button 424 or the "Deny" graphic button 426. If the visitor clicked on the "Deny" graphic button 426, the routine ends at step 126.

If the visitor clicked on the "Grant" button 424, the setup shortcut program is executed on the visitor processor 16. This causes a link for the vendor web site to be displayed on the visitor display 12. The vendor web site link (also called the shortcut link) may be displayed, for example, on the Windows (TRADEMARKED) start menu, desktop menu, tools menu, or QuickLaunch Bar. Thus the vendor web site link or shortcut link may now appear on the visitor's display anytime the visitor boots up his computer or visitor processor 16. The vendor web site link or shortcut link is a form of advertising on the visitor display 12 and also provides the visitor with quick, one click access to the vendor web site.

Figure 6:
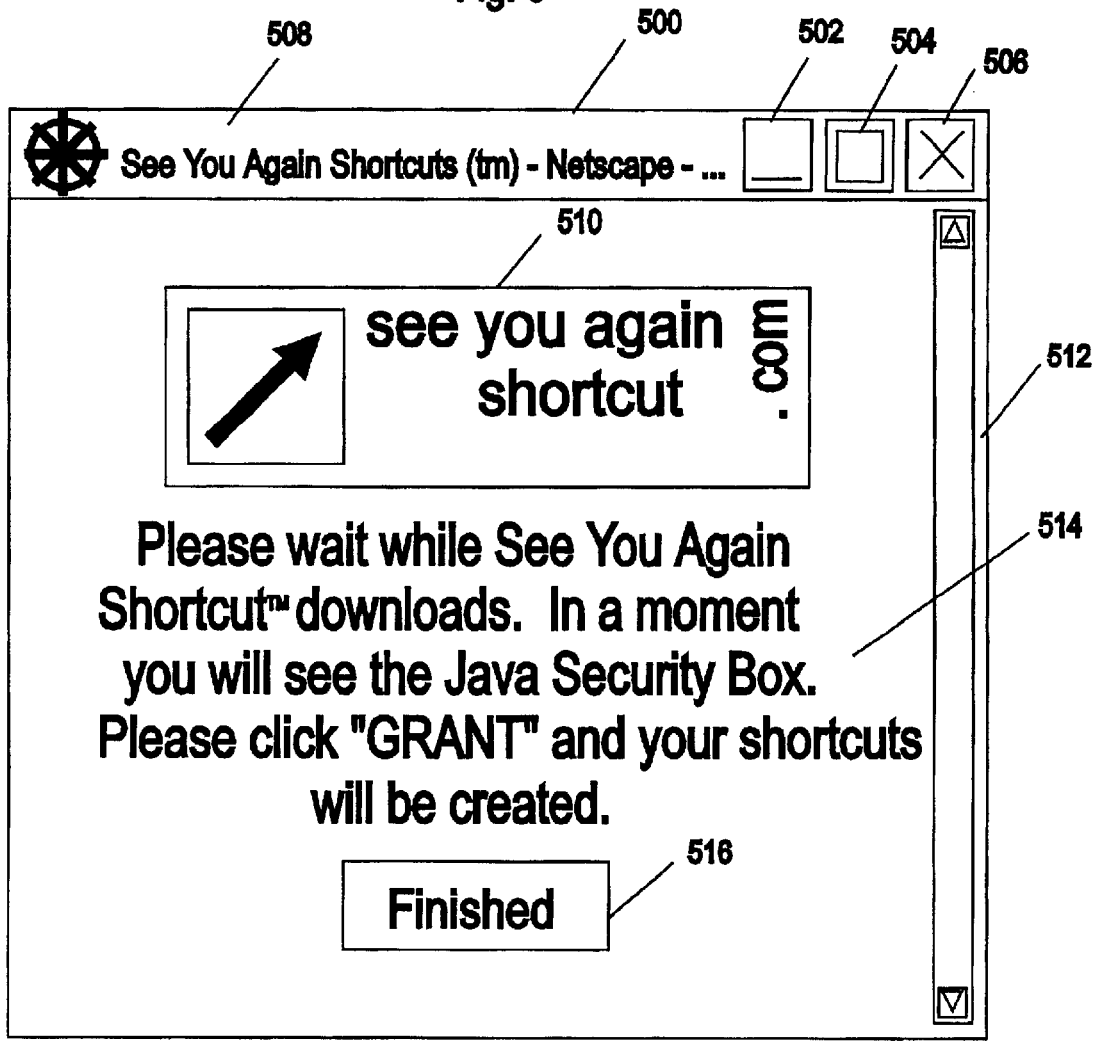
FIG. 6 shows a third pop up screen in accordance with a first embodiment of the present invention.

When the "See You Again Shortcut™" program on the vendor web site server 22 has finished downloading and executing the visitor may click on a "Finished" graphic button 516, which may be an HTML button, shown in a pop up menu 500 shown in FIG. 6. The pop up menu 500 may appear at the same time as the pop up menu 400 shown in FIG. 5, but the menus 500 and 600 may appear on different parts of the visitor display 12. The pop up menu 500 in FIG. 6 includes minimize, restore, and close graphic buttons 502, 504, and 506, and text 508. The menu 500 also includes a graphic button 510, a cursor field 512, and text 514.

The "See You Again Shortcut" ™ software the vendor buys typically sits on the vendor web site server processor 22 and is never executed or "run" on the web site server processor 22 itself. Rather, Java Applets are simply downloaded from the web site server processor 22 (much like an HTML page or image is downloaded to a visitor's browser on a visitor processor) and then automatically executed or "run" on the visitor's processor, such as visitor processor 16 in FIG. 1.

Although Java Applets have been used in this example, the Java Applets could be replaced by any computer software application which could be written in a computer programming language such as Visual Basic (TRADEMARKED), C++ (TRADEMARKED), or C# (TRADEMARKED).

Figure 7:
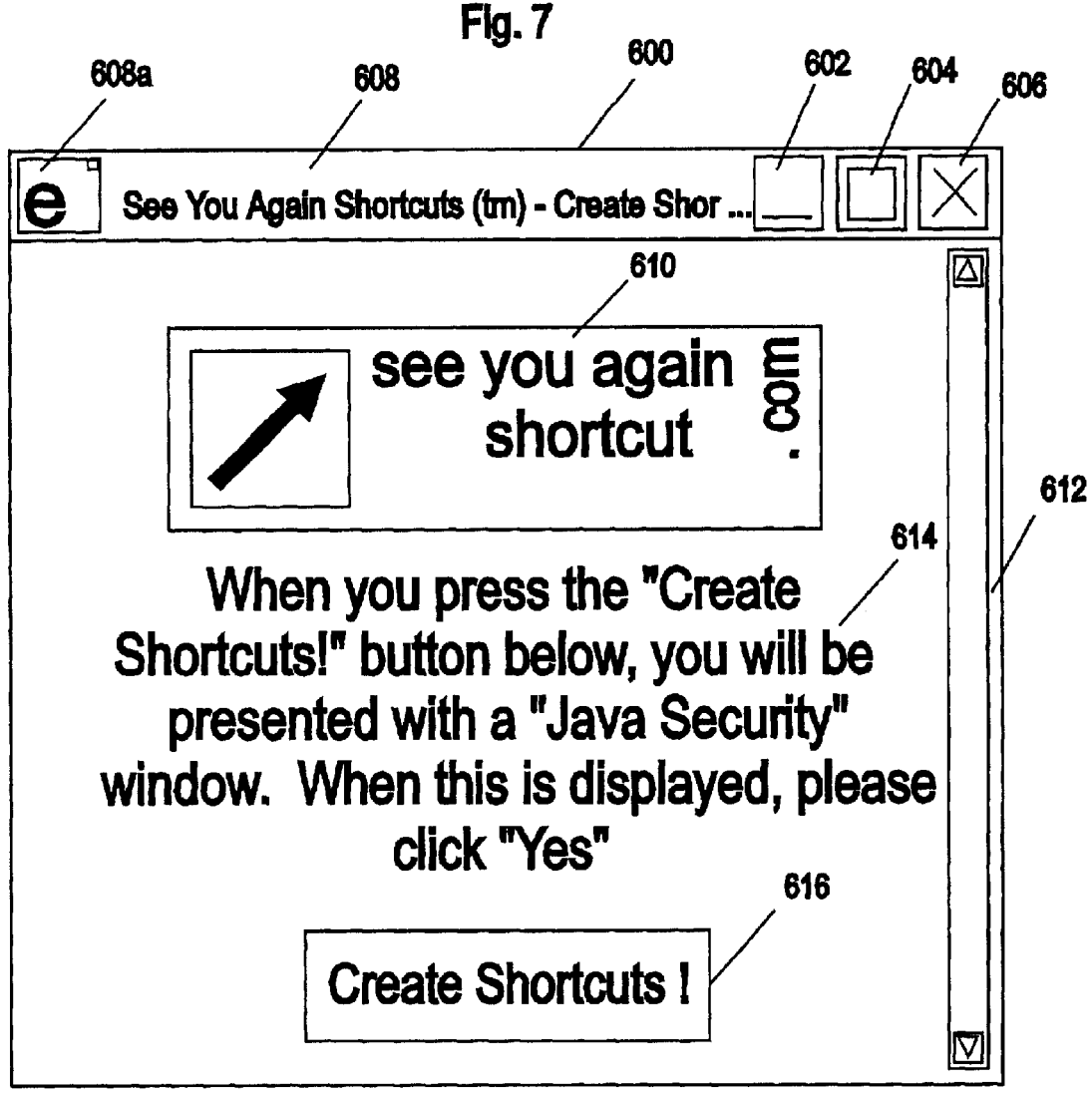
FIG. 7 shows a first pop up screen in accordance with a second embodiment of the present invention.

If the visitor is currently employing an "Internet Explorer" (TRADEMARKED) web site browser, at step 114, the visitor clicks on graphic button 208, which states "Add Shortcuts to Us!", and the pop up page 600 shown in FIG. 7 appears. The graphic button 208 can also state "Add Us To Your Desktop!" or another appropriate phrase which may depend on the type of shortcut to be created. The pop up page 600 includes a "minimize" button 602, a restore button 604, and a close button 606 as known in the art for the "Windows" (TRADEMARKED) operating system. The pop up page 600 also includes a "Internet Explorer" symbol 608a (TRADEMARKED), and text 608. The pop up page 600 further includes a button 610 on which is shown the phrase "see you again shortcut.com". The pop up page 600 also includes cursor field 612, text 614, and a graphic button 616, which may also be an HTML button, which may state "Create Shortcuts!" or "Add Us To Your Desktop!" or another appropriate phrase or expression which may depend on the type of shortcut to be created.

For the Internet Explorer (TRADEMARKED) case, at step 118 of FIG. 2A, the visitor clicks on the graphic button 616 by using, for example the visitor interactive device 18 of FIG. 1. At step 120, as shown in FIG. 2B, a setup shortcut software program is downloaded from either the vendor web site server processor 22 or the "seeyouagainshortcut.com" server processor 30 to the visitor processor 16 via bus 22a or bus 30a, respectively. The setup shortcut software program may be stored in the visitor memory 14. At step 122 a further pop up page may be displayed on the visitor display 12. In the case where an "Internet Explorer" (TRADEMARKED) web browser is being employed, a pop up page 700 shown in FIG. 8 may appear on the visitor display 12.

Figure 8:
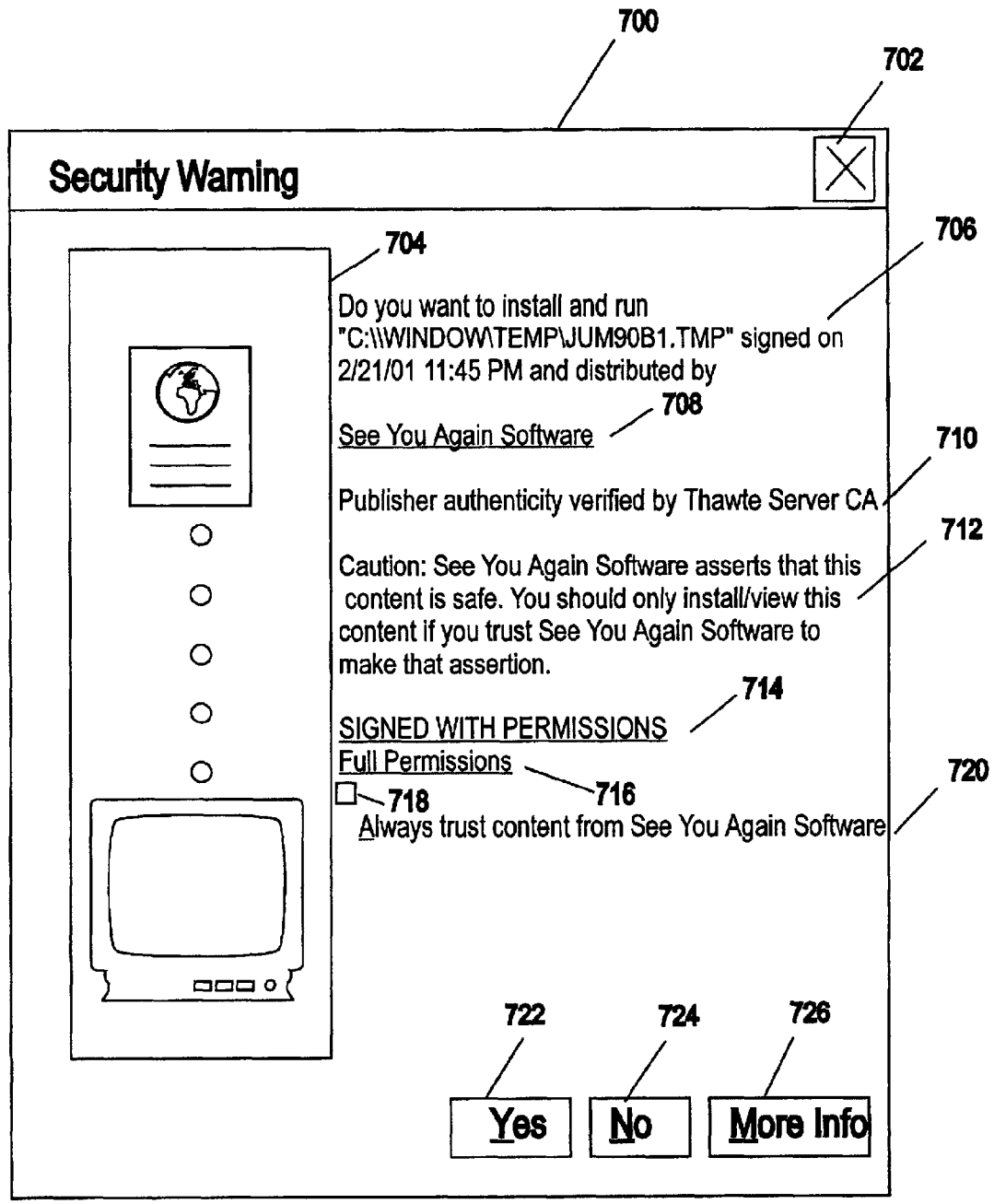
FIG. 8 shows a second pop up screen in accordance with a second embodiment of the present invention.

The pop up page 700 in FIG. 8 includes close graphic button 702 as known in the Windows (TRADEMARKED) operating system art. The pop up page 700 also includes graphical box 704, text 706, text button 708, text 710, text 712, text button 714, text button 716, check box 718, and text 720. The pop up page 700 also includes graphic buttons 722, 724, and 726. For the "Internet Explorer" (TRADEMARKED) case a visitor can click on either the "Yes" graphic button 722 or the "No" graphic button 724 very similarly to the "Grant" button 424 and the "Deny" button 426 of FIG. 5 for "Netscape" (TRADEMARKED), at step 124 of FIG. 2B. If the visitor clicks on the "No" graphic button 724 in FIG. 8, the routine ends, as at step 126 of FIG. 2B. If the visitor clicks on the "Yes" graphic button 722, the setup shortcut program is installed on the visitor memory 14 and executed by the visitor processor 16 to setup a vendor web site link on the visitor display 12. The setup web site link program for the "Internet Explorer" (TRADEMARKED) case, may be the program identified as "C:\\WINDOW\TEMP\JUM90B1.TMP" in text 706 of FIG. 8.

The execution of the setup shortcut program causes a link for the vendor web site or a shortcut link to be displayed on the visitor display 12. The vendor web site link or shortcut link may be displayed, for example, on the Windows (TRADEMARKED) start menu, desktop menu, tools menu, or QuickLaunch Bar. Thus the vendor web site link may now appear on the visitor display 12 anytime the visitor boots up his computer or visitor processor 16. The vendor web site link is a form of advertising on the visitor display 12 and also provides the visitor with quick, one click access to the vendor web site.

Figure 9:
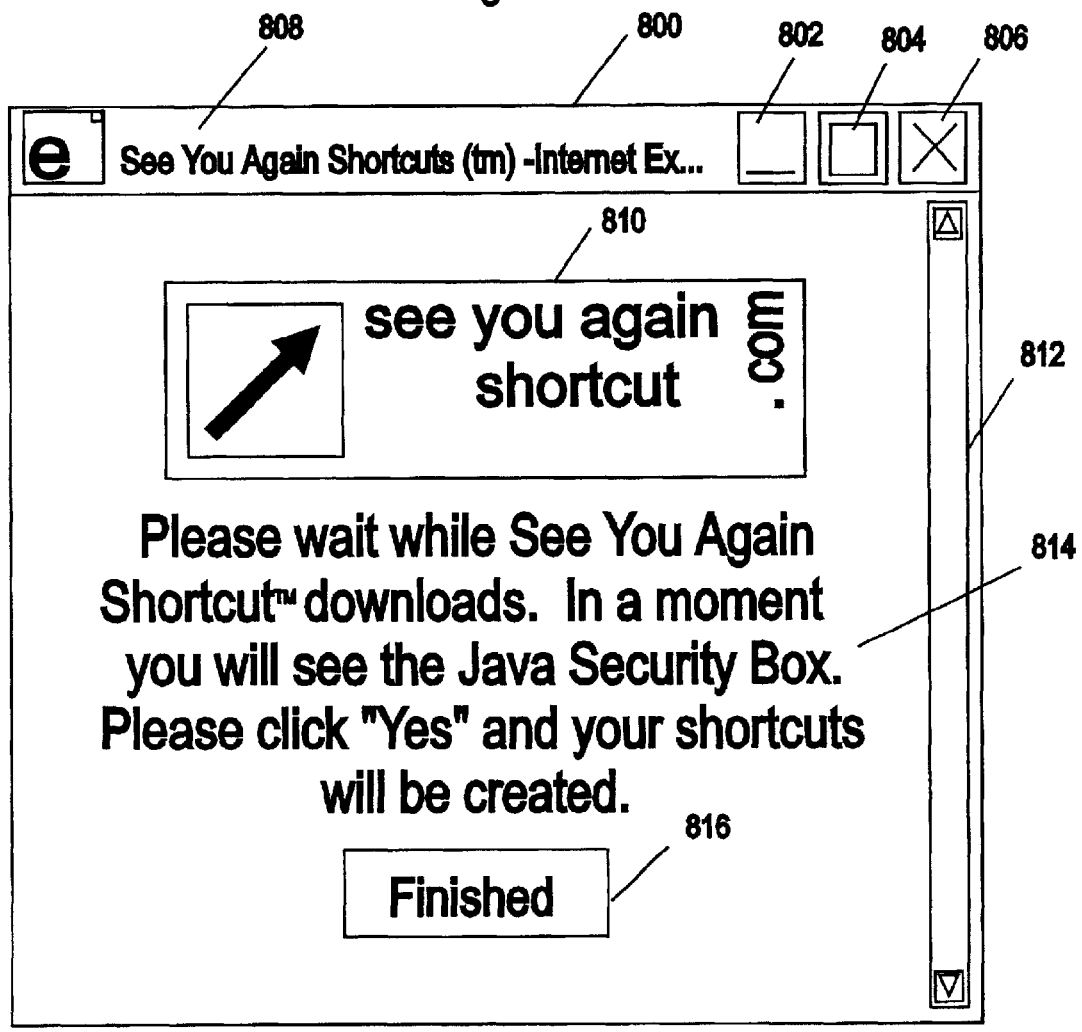
FIG. 9 shows a third pop up screen in accordance with a second embodiment of the present invention.

For the Internet Explorer (TRADEMARKED) case, when the visitor has finished downloading and executing the setup shortcut program, the visitor may click on a "Finished" graphic button 816, which may be an HTML button, shown in a pop up menu 800 in FIG. 9. The pop up menu 800 may appear at the same time as the pop up menu 700 shown in FIG. 8, but the menus 700 and 800 may appear on different parts of the visitor display 12. The pop up menu 800 in FIG. 9 includes minimize, restore, and close graphic buttons 802, 804, and 806, and text 808. The menu 800 also includes a graphic button 810, a cursor field 812, and text 814.

Figure 10:
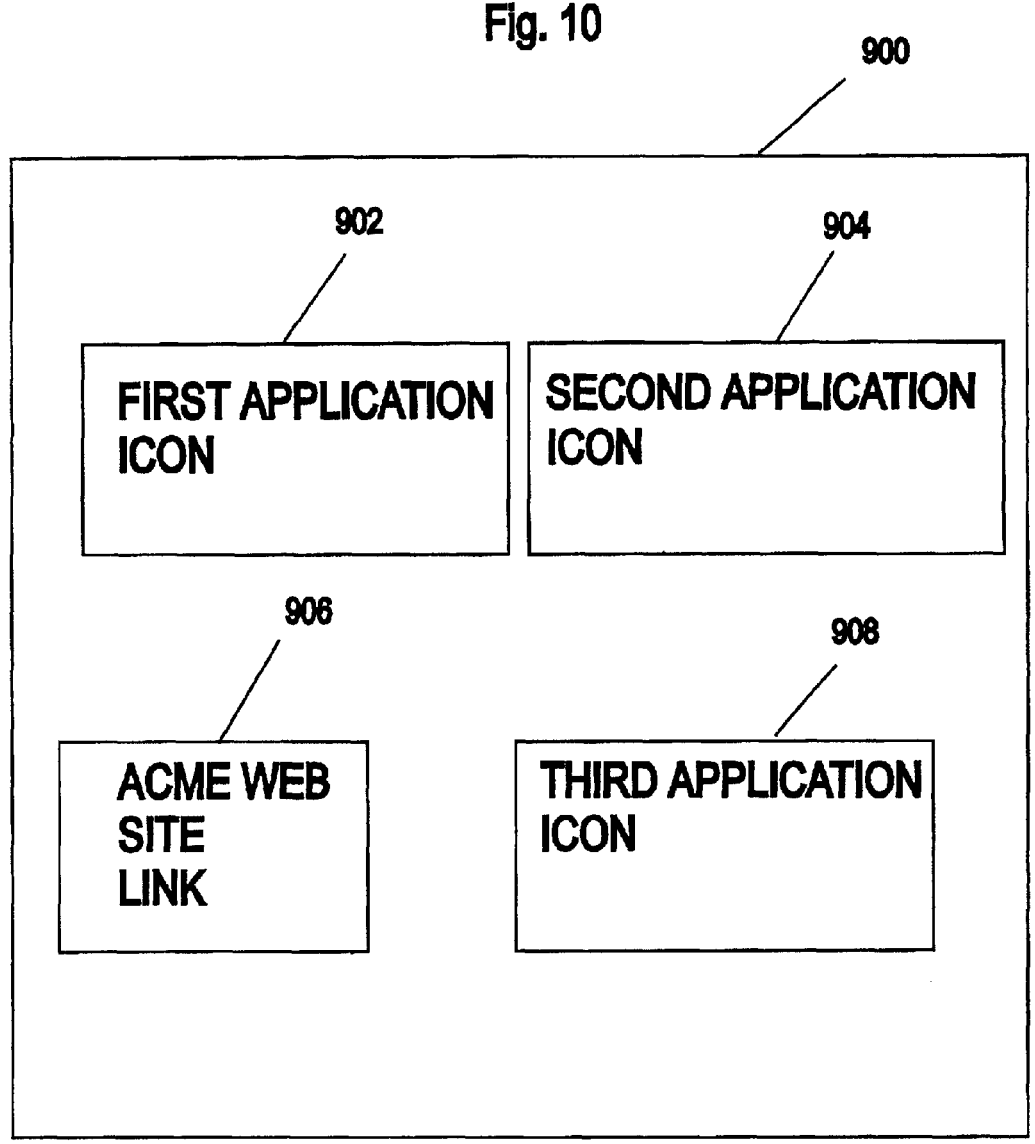
FIG. 10 shows a simplified example of a vendor web site link placed on a visitor display.

A simplified example of a vendor web site link on the visitor display 12 is shown in FIG. 10. FIG. 10 shows a screen 900 which may be displayed on the visitor display 12 as a Windows (TRADEMARKED) start menu or desktop menu upon booting up the visitor processor 16. The screen 900 includes acme web site link or graphic button 906, as well as first, second, and third application icons 902, 904, and 908. The application icons may include for example, an icon for Word by Microsoft (TRADEMARKED), an icon for EXCEL by Microsoft (TRADEMARKED), or other application programs. After the acme web site link 906 is initially installed, the visitor in the future may merely click once on the web site link 906. This will cause the acme web site home page 200 shown in FIG. 3 to appear on the visitor display 12.

FIG. 11 shows a flow chart of a method for adding an "ADD SHORTCUTS TO US" type link, (or could say "ADD US TO YOUR DESKTOP!") like graphic button 208 in FIG. 3, to a vendor's web site, which allows a visitor to the web site to add a shortcut link, like link 906 of FIG. 10.

The following files may be part of the setup program (or files making up what will be called "See You Again Shortcut™ software) that a vendor can purchase and store on the vendor processor 40 or in memory on the vendor processor 40 of FIG. 1:

I. General Files:
   (1) default.htm: The page contains Javascript (TRADEMARKED) programming language that detects the visitor's web browser version and level to ensure that "Internet Explorer" (TRADEMARKED) or "Netscape" (TRADEMARKED) 4.0 and higher is being used by the visitor's processor 16 of FIG. 1 before proceeding. If the appropriate browser is not being used the visitor is redirected to the "browser_ not_valid.htm" page. If the appropriate browser is being used the visitor is redirected to the appropriate page (e.g. iecab.htm or nsjar.htm) to download See You Again Shortcut™ software to the visitor's processor 16.
   (2) demo.htm: This page contains sample code to link a graphic button or text on the vendor web page to See You Again Shortcut™ software on the vendor web site server processor 22.
   (3) browser_not_valid.htm: The page that informs the visitor that they need to either use "Internet Explorer"

(TRADEMARKED) or "Netscape" (TRADEMARKED) 4.0 or higher in order to add a shortcut to the visitor display 12.

(4) genericlogo.ico: This is the generic link you can associate with your shortcuts. Graphic button 906 in FIG. 10 is an example of a generic link that can be associated with a shortcut. I.e. a box with text identifying the web site to which the shortcut is provided. Genericlogo.ico is the generic "icon" that you can associate with your shortcuts.

II. Internet Explorer (TRADEMARKED) Specific Files:

(1) ie.htm: The page that contains some instructions and a "Create Shortcuts" or "Add Us To Your or Desktop!" button.

(2) iecab.htm: The page that downloads the See You Again Shortcut™ Java Applet for Internet Explorer (TRADEMARKED) and provides the visitor with a confirmation.

(3) seeyouagainshortcutie.cab: The compressed and digitally signed See You Again Shortcut™ Java Applet that will be downloaded to the visitor processor 16 for Internet Explorer browsers.

(4) a.class: The class file that needs to be included for Internet Explorer (TRADEMARKED).

(5) syaslogo.gif: The See You Again Shortcut™ logo.

III. Netscape (TRADEMARKED) Specific Files:

(1) ns.htm: The page that contains the image of the Netscape Java Security window and the button having the phrase "Add Us To Your Desktop!" or "Add Shortcuts to Us! such as link 208 of FIG. 3.

(2) nsjar.htm: The page that downloads the See You Again Shortcut™ Java Applet to the visitor processor 16 for Netscape (TRADEMARKED) and provides the visitor with a confirmation.

(3) seeyouagainshortcutns.jar: The compressed and digitally signed See You Again Shortcut™ Java Applet that will be downloaded to the visitor processor from the vendor web site server processor 22 for Netscape (TRADEMARKED) browsers.

(4) syaslogo.gif: The See You Again Shortcut™ logo.

FIG. 11 is a flow chart 1000 of a method that can be performed by a vendor owner of the "See You Again Shortcut™ software" running on the vendor processor 40 to install a shortcut graphic button or text link like button 208 shown in FIG. 3 onto a web page of the web site of the vendor.

Step 1002 of the flow chart 1000 is to edit a list of parameters. The vendor would need to open the file "iecab.htm" to edit the "Internet Explorer" (TRADEMARKED) HTML (Hypertext Markup Language) parameter list and to open the file "nsjar.htm" to edit the "Netscape" (TRADEMARKED) HTML parameter list. This is where the vendor specifies whether to create a Windows (TRADEMARKED) Desktop shortcut, a Start Menu shortcut, or both to be shown on a visitor display, such as visitor display 12. This is also where the vendor specifies the icon to associate with the vendor's shortcut (such as 208 in FIG. 3) such as the vendor's company logo.

Please note that the values for the "param name=" values are typically case-sensitive (i.e. param name= DeskTopName). Also, the functionality labeled as "bonus" is available in Internet Explorer (TRADEMARKED) only (in the file "iecab.htm"). The following is an example of each ("your" in this example refers to the vendor):

To Create a Desktop Shortcut:

<param name=DeskTopName value="Your Web Site Name">

<param name=DeskTopURL value="URL for yourwebsite">

To Create a Start Menu Shortcut:

<param name=StartMenuName value="Your Web Site Name"> <param name=StartMenuURL value="URL for yourwebsite">

To Set Browser's Default Start Page to Your Homepage: (bonus)

<param name=StartPageURL value="URL for yourwebsite">

To Add Your Site to Your Visitor's Favorites: (bonus)

<param name=FavoritesName value="Your Web Site Name"> <param name=FavoritesURL value="URL for youwebsite">

To Add Your Site to Your Visitor's Links Bar: (bonus)

<param name=LinksBarName value="Your Web Site Name"> <param name=LinksBartURL value="URL for yourwebsite">

To Add Your Site to Your Visitor's Windows Quick-Launch Bar: (bonus)

<param name=QuickLaunchName value="Your Web Site Name"> <param name=QuickLaunchURL value= "URL for yourwebsite">

To Specify the Vendor's Link to be Placed on the Visitor Display 12:

<param name=IconPath value=URL for yourwebsite/"> <param name=IconName value="genericlogo.ico">

The icon that the vendor specifies must be in the Ico format, which is the file format of Windows (TRADEMARKED) icons assuming the link is an icon. For the vendor's link the vendor may choose from the following four choices if the link is an icon.

(1) If the vendor does not have a custom icon for the vendor's web site the vendor can use the generic icon entitled "genericlogo.ico" that is provided to the vendor as part of the "See You Again Shortcut™" computer software to be run on the vendor's processor 40.

(2) If the vendor prefers that the Internet Explorer (TRADEMARKED) or Netscape (TRADEMARKED) logo be displayed next to the vendor's shortcut link (which in this case is an icon) and associated with the vendor's shortcut link, rather than the generic logo, the vendor should remove the IconPath and IconName parameters.

(3) If the vendor does not have a custom icon but wants one, the vendor can use many of the popular image creation programs to create an icon in the Ico file format.

(4) If the vendor has their own custom icon such as the vendor's company logo the vendor can simply specify the correct path and filename to the vendor's custom icon and the vendor's brand will appear on the visitor's display 12 such as on the visitor's Desktop and/or Start Menu. The vendor should make sure the vendor gives an icon a unique name such as "yourcompanyname.ico". This will prevent the vendor's icon from getting overwritten by other icons with the same name.

Step 1004 of the method of the flow chart 1000 is to upload files. In order for the See You Again Shortcut™ computer software running on the vendor processor 40 to work in both Internet Explorer (TRADEMARKED) and Netscape (TRADEMARKED) the vendor needs to upload all the "general" files previously listed and all the specific files listed above for both web browsers from the vendor processor 40 to the vendor web site server processor 22. The files should be placed on the web site server processor 22 (or memory 20) under one directory in a folder named "syas", but other names are possible. If the vendor decides to create their own directory structure (including subfolders) the vendor will typically need to edit the HTML general and specific files above and change the paths to the files.

Step 1006 of the method of the flow chart 1000 is to activate the See You Again Shortcut™ computer software program on the vendor web site server processor 22. See You Again Shortcut™ software can be activated two ways. Both methods can be used.

(1) Place a button or text link on the vendor web site web page that a visitor can click on.

(2) Begin an "automatic initialization" of See You Again Shortcut™ computer software the first time a visitor visits the vendor's web site (1) Button or Text Link The vendor can use any link or button on his web site page to get visitors to the vendor's web site to activate See You Again Shortcut™. Typically the vendor will need to copy and paste the HTML link code into every web page the vendor wants to link to See You Again Shortcut™. To maximize the vendor's shortcut conversions it is recommend to place these links on every page.

If the vendor wants a horizontal button the vendor can right click on a prepared horizontal image indicating "ADD US TO YOUR DESKTOP!" or "Add shortcuts to us!" or some other appropriate phrase or expression, which may depend on the shortcut used and save it as "syas_horizontal.gif" to the vendor's hard drive such as on vendor memory 42 in FIG. 1.

Here is code the vendor can copy and paste into the vendor's web page to link a horizontal button to See You Again Shortcut™ software on the vendor web site server processor 22. Typically "URL for yoursite.com" will be replaced with the vendor's real domain name, such as for example URL for acme.com.

```
<a href="javascript:void(window.open ('URL for yourwebsite.com/syas/default.htm','Shortcut', 'alwaysRaised=yes,resizable=yes,scrollbars=yes, width=350,height=350,left=100,top=100, screenX=100,screenY=100'));"><img src="URL for yoursite.com/syas/syas_horizontal.gif" alt="Add Shortcuts to Us" border="0"></a>
```

If a vertical button is desired the above code can be used with the exception that "syas_vertical.gif" (where this is a prepared vertical button stating "ADD US TO YOUR DESKTOP!" or "ADD SHORTCUTS TO US!" or another appropriate expression) takes the place of "syas_horizontal.gif". "Alternatively, a text link can be used taking the place of the horizontal button."

2. Automatic Initialization

An automatic initialization method can be used to maximize the vendor's shortcut conversions. The automatic initialization method may work as follows:

(1) The first time a visitor comes to a vendor's web site homepage a popup box may appear prompting the visitor to add the vendor's web site to the visitor's Desktop. Using this method will quickly and easily create thousands and thousands of shortcuts. Your visitor is only automatically prompted a single time so this method is not obtrusive. The vendor would typically need to add the following javascript code to every web page of the vendor's web site HTML code that the vendor wants automatic initialization to occur. The javascript code can be placed between the opening and closing HEAD tags (e.g. <HEAD> </HEAD>) which are located near the top of each vendor HTML web page. The name "URL for yoursite.com" would be replaced with the vendor's actual web site name, such as "URL for acme.com":

```
<script language="javascript"> <!-
//If the cookie does not exist this is a first time visit if (document.cookie.indexOf("popup=true")==-1)
{expireDate=new Date expireDate.setMonth (expireDate.getMonth( )+24) document.cookie= "popup=true; expires="+expireDate.toGMTString( );
//popup the window
window.open ('URL for yoursite.com/syas/default.htm', 'Shortcut','alwaysRaised=yes,resizable=yes, scrollbars=yes, width=350,height=350,left=100,top= 100,screenX=100,screenY=100') }//->
```

At step 1008 the link on the web page of the vendor's web site is displayed." If the vendor wants "See You Again Shortcut™ to appear in the default popup box then this step can be skipped. If the vendor wants to make "See You Again Shortcut" show up in the main window, and not in a popup window, the vendor may change the following Javascript portion in the link code of the vendor's HTML web page code. (The "URL for yoursite.com" name will be replaced with the vendor's real domain name, such as for example "URL for acme.com".)

From:

Javascript: void(window.open ('URL for yoursite.com/syas/default.htm','Shortcut','always es,resizables=yes, scrollbars=yes,width=350,height=350,left=100, screenX=100, screenY=100'));

to:

javascript:: void(window.location.href=('URL for yoursite.com/syas/default.htm'));

The setup computer program to be downloaded onto the visitor processor 16 to allow the visitor to create a shortcut to the vendor's web site is typically tiny in file size". The same is true for the shortcut code that ultimately resides on the visitor processor 16 or visitor memory 14—it has a tiny file size as well. The part of the "see you again shortcuts.com" software code that ultimately resides on the visitor processor 16 or in visitor memory 14 can be a Java Applet which effectively is a cross platform programming language that is highly web enabled and commonly used to extend a web site's functionality. The portion of the software code which ultimately resides on visitor processor 16 or memory 14 is web enabled in the sense that it is activated and automatically run directly from an internet web page.

The computer program downloaded to the visitor processor 16 or memory 14 is automatically saved to a folder on the visitor processor 16 or memory 14 that is specified by the web browser. Typically, the visitor does not have to manually choose the folder, select a file name, save it to their hard drive on visitor processor 16 or memory 14, and then manually run the software. These steps are all done automatically. No computer software application is installed in the typical sense of the word. A typical installation of a software program would involve manual work by the visitor and many more files and changes to the visitor's computer processor 16. See You Again Shortcut™ computer software may in one embodiment contain only two files for Internet Explorer and only one file for Netscape that simply are automatically downloaded to a folder specified by the web browser and then automatically run. The names of the files for Internet Explorer (TRADEMARKED) may be "a.class" and "seeyouagainshortcutie.cab". The name of the file for Netscape (TRADEMARKED) is "seeyouagainshortcutns.jar". However, I believe the browser might assign it's own naming convention for these files when they are downloaded. The files mentioned are the actual Java files that perform that functionality of creating the shortcuts on the visitor processor 16.

In at least one embodiment the majority, if not all, of the See You Again Shortcut™ computer software resides on the vendor web site server and is linked to from the vendor web page. Typically, the only time the software is "activated" is when the visitor processor 16 downloads it from the vendor web site server processor 22 and runs the software on the visitor processor 16.

The present invention in one or more embodiments gives visitors to a vendor's web site the ability to place a company logo on the visitor's display, such as display 12, in FIG. 1, or in some embodiments on the visitor's Windows (trademarked) Desktop or Start Menu on the visitor display 12. The visitors can then click on the logo at any time—right from the visitor's display 12 or Desktop—and are automatically taken directly back to the vendor's web site.

The present invention allows vendors to drive targeted traffic to a vendor's web site, to increase a vendor's sales, and to get power branding of a web site through the use of the shortcut link on the visitor display."

In one embodiment of the present invention an affiliate identification number can be embedded in the web site shortcut to be placed on the visitor display 12. For example, "Amazon.com" (TRADEMARKED) may have an affiliate such as "Joe's bookstore.com". The web site for "Joe's bookstore.com" may have a link to "Amazon.com" (TRADEMARKED). Assuming a visitor has reached "Amazon.com" through the link in "Joe's bookstore.com", and assuming a visitor then executed the method of FIGS. 2A–2B, then an "Amazon.com" (TRADEMARKED) shortcut link displayed on the visitor display 12, and that shortcut will have embedded in it an identification for "Joe's bookstore.com". In the future when the visitor clicks on the shortcut link for "Amazon.com" (TRADEMARKED) on the visitor display 12, "Joe's bookstore.com" can receive credit or money assuming the visitor buys something on the "Amazon.com" web site. The shortcut links to, for example, "Amazon.com" (TRADEMARKED) can be created either from the vendor's web site (i.e. from the "Amazon.com" (TRADEMARKED) web site) or from the affiliate's web site (i.e. from "Joe's bookstore.com"'s web site).

The embedding of the affiliate identification into the shortcut can be accomplished by embedding the affiliate identification into a query string so the affiliate identification can be retrieved by the vendor web site. The following is an example:

<param name=DeskTopURL value="URL for yourwebsiteURL.com?affiliated=1234">Generally information for a shortcut link can be embedded in a short cut file which may be stored in the visitor processor 16 or visitor memory 14.

In another embodiment of the present invention a coupon code can be embedded in a query string so that the coupon code can be retrieved by the web site server processor. The coupon code being passed in the querystring (and all the information in the shortcut for that matter) can be embedded in a shortcut file (typically not any HTML code) that resides on the visitor processor 16. This can be done as follows:

<param name=DeskTopURL value=URL for yourwebsiteURL.com?coupon=freetrial>

For the coupon code example, the software code for the vendor's web site on the web site server processor 22 should be customized so the vendor web site server processor 22 can capture the coupon code that is being passed and handle it accordingly.

There may be considerable overlap on how information is "embedded" in the shortcut. It may be done by appending variables to the URL (query string).

The flow as to how one might create a Desktop Coupon for display on the visitor display 12, could be very similar to the putting the web site shortcut link on the display 12 in the sense that the button is simply changed to read "Get a Desktop Coupon!" instead of "Add Us To Your Desktop!"

However, a smarter implementation of the Coupon Edition might be to work See You Again Shortcut™ directly into the vendor's ordering process. So, when a visitor fills out a vendor's order form on the vendor's web site the vendor web site automatically prompts the visitor to place a coupon on the visitor display 12 valid towards a future order (much like supermarkets include coupons in your grocery bag along with your receipt).

In another embodiment of the present invention, a member's (or visitor registered as a member) username and password may be embedded into the Internet shortcut. This would eliminate the need for the member to remember their username and password and to repeatedly enter this information. Simply click the Internet Shortcut and the member is automatically authenticated. The username and password can be embedded in the query string so it can be retrieved by the web site.

Hers is an example:

<param name=DeskTopURL value=URL of yourwebsiteURL.com?username=John?password=secret>

A username of "john" and a password of "secret" have been included in the URL above for the Desktop shortcut. This embodiment requires customization on the vendor's web site so the vendor can capture the username and password that is being passed and do the automatic authentication.

The flow as to how one might create an Automated Login could be very similar to the basic embodiment in the sense that the button or text link on the vendor web site is simply changed to read "Get an Automated Login!" instead of "Add Shortcuts to Us!"

However, a smarter implementation of the Automated Login Edition may be to work See You Again Shortcut™ directly into the member sign up process. So, when a customer fills out the membership form the vendor web site automatically prompts them to place an Automated Login link on the visitor's display 12 or Desktop.

In another embodiment the "See You Again Shortcut™ (TRADEMARKED) software provided to the vendor performs the following "bonus functionality:"

(1) Sets the visitor's browser's default start page to the vendor's web site home page;

(2) Adds the vendor's web site to a visitor's Favorites list;

(3) Adds the vendor's web site to a visitor's Links Bar; and (4) Adds the vendor's web site to a visitor's Windows QuickLaunch (TRADEMARKED) Bar.

The above four additional functions can be done at one time in one embodiment.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising the steps of:

making a first button part of a vendor's first web site page of a vendor's web site;

providing and indication on the vendor's first web site page indicating that the first button is to be used to add a shortcut to the vendor's web site;

causing a shortcut link to be placed on a display of a visitor to the vendor's web site in response to an add short cut process started by the selection of the first button on the vendor's first web site page by the visitor to the vendor's web site;

wherein selection of the shortcut link on the display of the visitor causes a vendor's second web site page of the vendor's web site to be displayed on the display of the visitor; and wherein after the first button is made part of the vendor's first web site page, the first button automatically appears on the vendor's first web site page whenever the vendor's first web site page is displayed.

2. The method of claim 1 wherein
the shortcut link is placed on a Desktop menu on the display of the visitor.

3. The method of claim 1 wherein
the shortcut link is placed on a Start menu on the display of the visitor.

4. The method of claim 1 wherein
the shortcut link is placed on a Favorites list menu on the display of the visitor.

5. The method of claim 1 wherein
the shortcut link is placed on a Links Bar menu on the display of the visitor.

6. The method of claim 1 wherein
the shortcut link is placed on a Windows QuickLaunch (TRADEMARKED) Bar menu on the display of the visitor.

7. The method of claim 1 wherein
the shortcut link identifies the vendor.

8. The method of claim 1 wherein
selection of the shortcut link on the display of the visitor causes a coupon code to be transferred to a vendor web site server processor.

9. The method of claim 1 wherein
selection of the shortcut link on the display of the visitor causes a username and a password which identify the visitor to be transferred to a vendor web site server processor.

10. The method of claim 1 wherein
selection of the shortcut link on the display of the visitor causes data identifying an affiliate of the vendor to be transferred to a vendor web site server processor.

11. The method of claim 10 wherein
prior to the placement of the shortcut link on the display of the visitor, the visitor to the vendor's web site accesses the vendor's web site through a web site of the affiliate of the vendor.

12. The method of claim 1
wherein the add shortcut process includes granting privileges to allow a visitor shortcut software program to modify software on a processor of the visitor.

13. The method of claim 1 wherein
the add shortcut process includes displaying a first pop up screen on the display of the visitor in response to selection of the first button on the vendor's web site web page.

14. The method of claim 13 wherein
the first pop up screen includes a second button which can be selected to cause the shortcut process to continue.

15. The method of claim 14 wherein
the second button is an HTML button.

16. The method of claim 1 wherein
the first button is a graphic button displayed on the visitor display.

17. The method of claim 1 wherein
the first button is a text button displayed on the visitor display.

18. The method of claim 17 wherein
the indication includes the word "shortcut".

19. A method comprising the steps of using a vendor processor to edit a first parameter in a first file concerning a characteristic of a first shortcut link to a vendor web site;

uploading the first file including the first parameter to a vendor web site server processor; and placing a button on the vendor web site, which can be clicked on by a visitor by using a visitor's computer and which when clicked on causes the start of a process which adds the first shortcut link to the visitor's computer in a manner such that the first shortcut link remains part of the visitor's computer even after the visitor's computer is rebooted; and wherein the vendor processor, the vendor web site server processor, and the visitor's computer are distinct from one another.

20. The method of claim 19 wherein
editing the first parameter determines an icon to be associated with the first shortcut link.

21. The method of claim 19 wherein
editing the first parameter determines a name to be associated with the first shortcut link.

22. The method of claim 19 further comprising
using the vendor processor to edit a second parameter in the first file concerning a characteristic of a second shortcut link to the vendor web site;

uploading the first file including the first parameter and the second parameter to the vendor web site server processor; and wherein the process which adds the first shortcut link to the visitor's computer also adds the second shortcut link to the visitor's computer in a manner such that the second shortcut link remains part of the visitor's computer even after the visitor's computer is rebooted.

* * * * *